US009141291B2

(12) United States Patent
Tuers et al.

(10) Patent No.: US 9,141,291 B2
(45) Date of Patent: Sep. 22, 2015

(54) ADAPTIVE CONTEXT DISBURSEMENT FOR IMPROVED PERFORMANCE IN NON-VOLATILE MEMORY SYSTEMS

(71) Applicant: SanDisk Technologies Inc., Plano, TX (US)

(72) Inventors: Daniel Tuers, Kapaa, HI (US); Yosief Ataklti, Fremont, CA (US); Abhijeet Mahohar, Bangalore (IN); Yoav Weinberg, Ontario (CA)

(73) Assignee: SanDisk Technologies Inc., Plano, TX (US)

( * ) Notice: Subject to any disclaimer, the term of this patent is extended or adjusted under 35 U.S.C. 154(b) by 142 days.

(21) Appl. No.: 14/090,247

(22) Filed: Nov. 26, 2013

(65) Prior Publication Data
US 2015/0149694 A1    May 28, 2015

(51) Int. Cl.
G06F 13/14 (2006.01)
G06F 3/06 (2006.01)
G06F 13/16 (2006.01)

(52) U.S. Cl.
CPC .............. G06F 3/061 (2013.01); G06F 3/0629 (2013.01); G06F 3/0679 (2013.01); G06F 13/1605 (2013.01)

(58) Field of Classification Search
CPC ..... G06F 3/061; G06F 3/0629; G06F 3/0679; G06F 13/1605
USPC .......................................... 711/103, 158, 167
See application file for complete search history.

(56) References Cited

U.S. PATENT DOCUMENTS 4,818,932 A   4/1989   Odenheimer
5,070,032 A   12/1991  Yuan et al.
5,095,344 A   3/1992   Harari
5,313,421 A   5/1994   Guterman et al.
5,315,541 A   5/1994   Harari et al.
5,343,063 A   8/1994   Yuan et al.
(Continued)

FOREIGN PATENT DOCUMENTS

WO    2008/070173 A1    6/2008

OTHER PUBLICATIONS

Eitan et al., "NROM: A Novel Localized Trapping, 2-Bit Nonvolatile Memory Cell," *IEEE Electron Device Letters*, vol. 21, No. 11, Nov. 2000, pp. 543-545.

(Continued)

*Primary Examiner* — Than Nguyen
(74) *Attorney, Agent, or Firm* — Davis Wright Tremaine LLP

(57) ABSTRACT

A controller circuit for a non-volatile memory of one or more memory circuits is described. The controller is connectable by a port with the memory circuits through a bus structure and can operate the memory circuits according to one or more threads. The controller includes a command processing section to issue high level commands for execution in the memory circuits and a memory circuit interface module to issue in sequence by the port to the memory circuits a series of instruction derived from the high level commands. A queue manager on the controller derives the series of instructions from the high level commands. When deriving a series of instruction from a set of high level data access commands, the queue manager can modify the timing for the issuance to the memory circuit interface module of memory circuit check status instructions based upon feedback from the memory circuit interface module and the state of earlier instruction in the series.

16 Claims, 13 Drawing Sheets

(56) References Cited

U.S. PATENT DOCUMENTS

| | | |
|---|---|---|
| 5,555,437 A | 9/1996 | Packer |
| 5,570,315 A | 10/1996 | Tanaka et al. |
| 5,595,924 A | 1/1997 | Yuan et al. |
| 5,661,053 A | 8/1997 | Yuan |
| 5,768,192 A | 6/1998 | Eitan |
| 5,903,495 A | 5/1999 | Takeuchi et al. |
| 6,006,307 A | 12/1999 | Cherukuri |
| 6,011,725 A | 1/2000 | Eitan |
| 6,046,935 A | 4/2000 | Takeuchi et al. |
| 6,222,762 B1 | 4/2001 | Guterman et al. |
| 6,397,313 B1 | 5/2002 | Kasa et al. |
| 7,057,939 B2 | 6/2006 | Li et al. |
| 7,480,766 B2 | 1/2009 | Gorobets |
| 7,529,905 B2 | 5/2009 | Sinclair |
| 7,634,621 B1 | 12/2009 | Coon et al. |
| 8,244,960 B2 | 8/2012 | Paley et al. |
| 2002/0069318 A1 | 6/2002 | Chow et al. |
| 2003/0120898 A1* | 6/2003 | Fischer et al. ............... 712/205 |
| 2005/0154819 A1 | 7/2005 | Conley et al. |
| 2006/0012603 A1 | 1/2006 | Lindholm et al. |
| 2007/0044103 A1 | 2/2007 | Rosenbluth et al. |
| 2007/0061581 A1 | 3/2007 | Holtzman et al. |
| 2007/0061597 A1 | 3/2007 | Holtzman et al. |
| 2007/0094459 A1 | 4/2007 | Suzuki et al. |
| 2007/0113030 A1 | 5/2007 | Bennett et al. |
| 2008/0155175 A1 | 6/2008 | Alt |
| 2008/0155176 A1 | 6/2008 | Sinclair et al. |
| 2008/0155177 A1 | 6/2008 | Sinclair et al. |
| 2008/0155178 A1 | 6/2008 | Sinclair et al. |
| 2008/0155227 A1 | 6/2008 | Sinclair et al. |
| 2008/0155228 A1 | 6/2008 | Sinclair et al. |
| 2010/0313052 A1* | 12/2010 | Ueda ............................. 713/324 |
| 2010/0318720 A1 | 12/2010 | Rajagopalan et al. |
| 2010/0325347 A1* | 12/2010 | Koh ............................... 711/103 |
| 2012/0204000 A1* | 8/2012 | Biran et al. .................... 711/202 |
| 2013/0097363 A1* | 4/2013 | Tan et al. ....................... 711/103 |

OTHER PUBLICATIONS

U.S. Appl. No. 12/348,819 entitled "Wear Leveling for Non-Volatile Memories: Maintenance of Experience Count and Passive Techniques," filed Jan. 5, 2009, 73 pages.

U.S. Appl. No. 12/348,825 entitled "Spare Block Management in Non-Volatile Memories," filed Jan. 5, 2009, 76 pages.

U.S. Appl. No. 12/348,891 entitled "Non-Volatile Memory and Method With Write Cache Partitioning," filed Jan. 5, 2009, 151 pages.

U.S. Appl. No. 12/348,895 entitled "Nonvolatile Memory With Write Cache Having Flush/Eviction Methods," filed Jan. 5, 2009, 151 pages.

U.S. Appl. No. 12/348,899 entitled "Non-Volatile Memory and Method With Write Cache Partition Management Methods," filed Jan. 5, 2009, 149 pages.

U.S. Appl. No. 61/142,620 entitled "Non-Volatile Memory and Method With Improved Block Management System," filed Jan. 5, 2009, 144 pages.

* cited by examiner

Programming into Four States Represented by a 2-bit Code

ADAPTIVE CONTEXT DISBURSEMENT FOR IMPROVED PERFORMANCE IN NON-VOLATILE MEMORY SYSTEMS

BACKGROUND

This application relates to the operation of re-programmable non-volatile memory systems such as semiconductor flash memory, and, more specifically, to the management of such systems having multiple memory circuits and using multiple threads in the management of the memory circuits.

Solid-state memory capable of nonvolatile storage of charge, particularly in the form of EEPROM and flash EEPROM packaged as a small form factor card, has recently become the storage of choice in a variety of mobile and handheld devices, notably information appliances and consumer electronics products. Unlike RAM (random access memory) that is also solid-state memory, flash memory is non-volatile, and retaining its stored data even after power is turned off. Also, unlike ROM (read only memory), flash memory is rewritable similar to a disk storage device. In spite of the higher cost, flash memory is increasingly being used in mass storage applications. Conventional mass storage, based on rotating magnetic medium such as hard drives and floppy disks, is unsuitable for the mobile and handheld environment. This is because disk drives tend to be bulky, are prone to mechanical failure and have high latency and high power requirements. These undesirable attributes make disk-based storage impractical in most mobile and portable applications. On the other hand, flash memory, both embedded and in the form of a removable card is ideally suited in the mobile and handheld environment because of its small size, low power consumption, high speed and high reliability features.

Flash EEPROM is similar to EEPROM (electrically erasable and programmable read-only memory) in that it is a non-volatile memory that can be erased and have new data written or "programmed" into their memory cells. Both utilize a floating (unconnected) conductive gate, in a field effect transistor structure, positioned over a channel region in a semiconductor substrate, between source and drain regions. A control gate is then provided over the floating gate. The threshold voltage characteristic of the transistor is controlled by the amount of charge that is retained on the floating gate. That is, for a given level of charge on the floating gate, there is a corresponding voltage (threshold) that must be applied to the control gate before the transistor is turned "on" to permit conduction between its source and drain regions. In particular, flash memory such as Flash EEPROM allows entire blocks of memory cells to be erased at the same time.

The floating gate can hold a range of charges and therefore can be programmed to any threshold voltage level within a threshold voltage window. The size of the threshold voltage window is delimited by the minimum and maximum threshold levels of the device, which in turn correspond to the range of the charges that can be programmed onto the floating gate. The threshold window generally depends on the memory device's characteristics, operating conditions and history. Each distinct, resolvable threshold voltage level range within the window may, in principle, be used to designate a definite memory state of the cell.

The transistor serving as a memory cell is typically programmed to a "programmed" state by one of two mechanisms. In "hot electron injection," a high voltage applied to the drain accelerates electrons across the substrate channel region. At the same time a high voltage applied to the control gate pulls the hot electrons through a thin gate dielectric onto the floating gate. In "tunneling injection," a high voltage is applied to the control gate relative to the substrate. In this way, electrons are pulled from the substrate to the intervening floating gate. While the term "program" has been used historically to describe writing to a memory by injecting electrons to an initially erased charge storage unit of the memory cell so as to alter the memory state, it has now been used interchangeable with more common terms such as "write" or "record."

The memory device may be erased by a number of mechanisms. For EEPROM, a memory cell is electrically erasable, by applying a high voltage to the substrate relative to the control gate so as to induce electrons in the floating gate to tunnel through a thin oxide to the substrate channel region (i.e., Fowler-Nordheim tunneling.) Typically, the EEPROM is erasable byte by byte. For flash EEPROM, the memory is electrically erasable either all at once or one or more minimum erasable blocks at a time, where a minimum erasable block may consist of one or more sectors and each sector may store 512 bytes or more of data.

The memory device typically comprises one or more memory chips that may be mounted on a card. Each memory chip comprises an array of memory cells supported by peripheral circuits such as decoders and erase, write and read circuits. The more sophisticated memory devices also come with a controller that performs intelligent and higher level memory operations and interfacing.

There are many commercially successful non-volatile solid-state memory devices being used today. These memory devices may be flash EEPROM or may employ other types of nonvolatile memory cells. Examples of flash memory and systems and methods of manufacturing them are given in U.S. Pat. Nos. 5,070,032, 5,095,344, 5,315,541, 5,343,063, and 5,661,053, 5,313,421 and 6,222,762. In particular, flash memory devices with NAND string structures are described in U.S. Pat. Nos. 5,570,315, 5,903,495, 6,046,935. Also nonvolatile memory devices are also manufactured from memory cells with a dielectric layer for storing charge. Instead of the conductive floating gate elements described earlier, a dielectric layer is used. Such memory devices utilizing dielectric storage element have been described by Eitan et al., "NROM: A Novel Localized Trapping, 2-Bit Nonvolatile Memory Cell," IEEE Electron Device Letters, vol. 21, no. 11, November 2000, pp. 543-545. An ONO dielectric layer extends across the channel between source and drain diffusions. The charge for one data bit is localized in the dielectric layer adjacent to the drain, and the charge for the other data bit is localized in the dielectric layer adjacent to the source. For example, U.S. Pat. Nos. 5,768,192 and 6,011,725 disclose a nonvolatile memory cell having a trapping dielectric sandwiched between two silicon dioxide layers. Multi-state data storage is implemented by separately reading the binary states of the spatially separated charge storage regions within the dielectric.

In order to improve read and program performance, multiple charge storage elements or memory transistors in an array are read or programmed in parallel. Thus, a "page" of memory elements are read or programmed together. In existing memory architectures, a row typically contains several interleaved pages or it may constitute one page. All memory elements of a page will be read or programmed together.

In flash memory systems, erase operation may take as much as an order of magnitude longer than read and program operations. Thus, it is desirable to have the erase block of substantial size. In this way, the erase time is amortized over a large aggregate of memory cells.

The nature of flash memory predicates that data must be written to an erased memory location. If data of a certain logical address from a host is to be updated, one way is rewrite the update data in the same physical memory location. That is, the logical to physical address mapping is unchanged. However, this will mean the entire erase block contain that physical location will have to be first erased and then rewritten with the updated data. This method of update is inefficient, as it requires an entire erase block to be erased and rewritten, especially if the data to be updated only occupies a small portion of the erase block. It will also result in a higher frequency of erase recycling of the memory block, which is undesirable in view of the limited endurance of this type of memory device.

Data communicated through external interfaces of host systems, memory systems and other electronic systems are addressed and mapped into the physical locations of a flash memory system. Typically, addresses of data files generated or received by the system are mapped into distinct ranges of a continuous logical address space established for the system in terms of logical blocks of data (hereinafter the "LBA interface"). The extent of the address space is typically sufficient to cover the full range of addresses that the system is capable of handling. In one example, magnetic disk storage drives communicate with computers or other host systems through such a logical address space. This address space has an extent sufficient to address the entire data storage capacity of the disk drive.

Flash memory systems are most commonly provided in the form of a memory card or flash drive that is removably connected with a variety of hosts such as a personal computer, a camera or the like, but may also be embedded within such host systems. When writing data to the memory, the host typically assigns unique logical addresses to sectors, clusters or other units of data within a continuous virtual address space of the memory system. Like a disk operating system (DOS), the host writes data to, and reads data from, addresses within the logical address space of the memory system. A controller within the memory system translates logical addresses received from the host into physical addresses within the memory array, where the data are actually stored, and then keeps track of these address translations. The data storage capacity of the memory system is at least as large as the amount of data that is addressable over the entire logical address space defined for the memory system.

In current commercial flash memory systems, the size of the erase unit has been increased to a block of enough memory cells to store multiple sectors of data. Indeed, many pages of data are stored in one block, and a page may store multiple sectors of data. Further, two or more blocks are often operated together as metablocks, and the pages of such blocks logically linked together as metapages. A page or metapage of data are written and read together, which can include many sectors of data, thus increasing the parallelism of the operation. Along with such large capacity operating units the challenge is to operate them efficiently.

For ease of explanation, unless otherwise specified, it is intended that the term "block" as used herein refer to either the block unit of erase or a multiple block "metablock," depending upon whether metablocks are being used in a specific system. Similarly, reference to a "page" herein may refer to a unit of programming within a single block or a "metapage" within a metablock, depending upon the system configuration.

When the currently prevalent LBA interface to the memory system is used, files generated by a host to which the memory is connected are assigned unique addresses within the logical address space of the interface. The memory system then commonly maps data between the logical address space and pages of the physical blocks of memory. The memory system keeps track of how the logical address space is mapped into the physical memory but the host is unaware of this. The host keeps track of the addresses of its data files within the logical address space but the memory system operates with little or no knowledge of this mapping.

Another problem with managing flash memory system has to do with system control and directory data. The data is produced and accessed during the course of various memory operations. Thus, its efficient handling and ready access will directly impact performance. It would be desirable to maintain this type of data in flash memory because flash memory is meant for storage and is nonvolatile. However, with an intervening file management system between the controller and the flash memory, the data cannot be accessed as directly. Also, system control and directory data tends to be active and fragmented, which is not conducive to storing in a system with large size block erase. Conventionally, this type of data is set up in the controller RAM, thereby allowing direct access by the controller. After the memory device is powered up, a process of initialization enables the flash memory to be scanned in order to compile the necessary system control and directory information to be placed in the controller RAM. This process takes time and requires controller RAM capacity, all the more so with ever increasing flash memory capacity.

In general, there is continuing search to improve the capacity and performance of non-volatile memory systems. In particular, this can include methods to improve the amount and efficiency of parallelism in memory systems.

SUMMARY OF THE INVENTION

General aspects of the invention include a controller circuit for a memory system that includes the controller circuit and one or more memory circuits, in which the controller circuit controls the transfer of data between the memory circuits and a host connected to the memory system and manages the storage of data on the memory circuits. The controller circuit includes a port by which the controller circuit is connectable to the one or more memory circuits through a bus structure. The controller also includes a command processing section, a memory circuit interface module, and a queue manager. The command processing section issues high level commands for execution in the memory circuits. The memory circuit interface module issues in sequence by the port to one or more of the memory circuits a series of instruction derived from the high level commands. The queue manager derives the series of instructions from the high level commands, wherein, when deriving a series of instruction from a set of high level data access commands, the queue manager modifies timing for the issuance to the memory circuit interface module of memory circuit check status instructions based upon feedback from the memory circuit interface module and the state of earlier instruction in the series derived from the set of high level data access commands.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications,

DETAILED DESCRIPTION

Memory System

FIG. 1 to FIG. 7 provide example memory systems in which the various aspects of the present invention may be implemented or illustrated.

Figure 8:
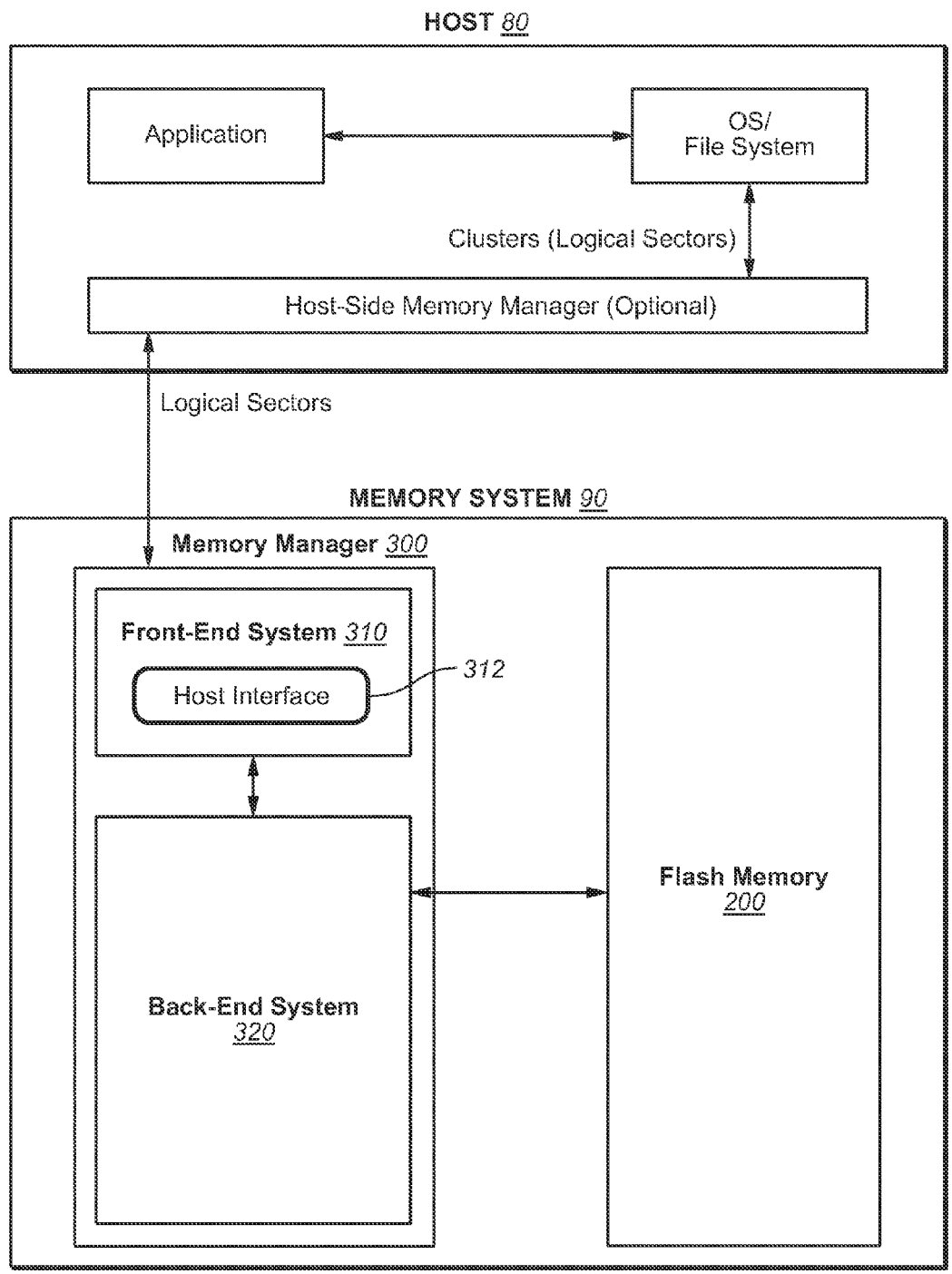
FIG. 8 illustrates the memory being managed by a memory manager with is a software component that resides in the controller.
Figure 9:
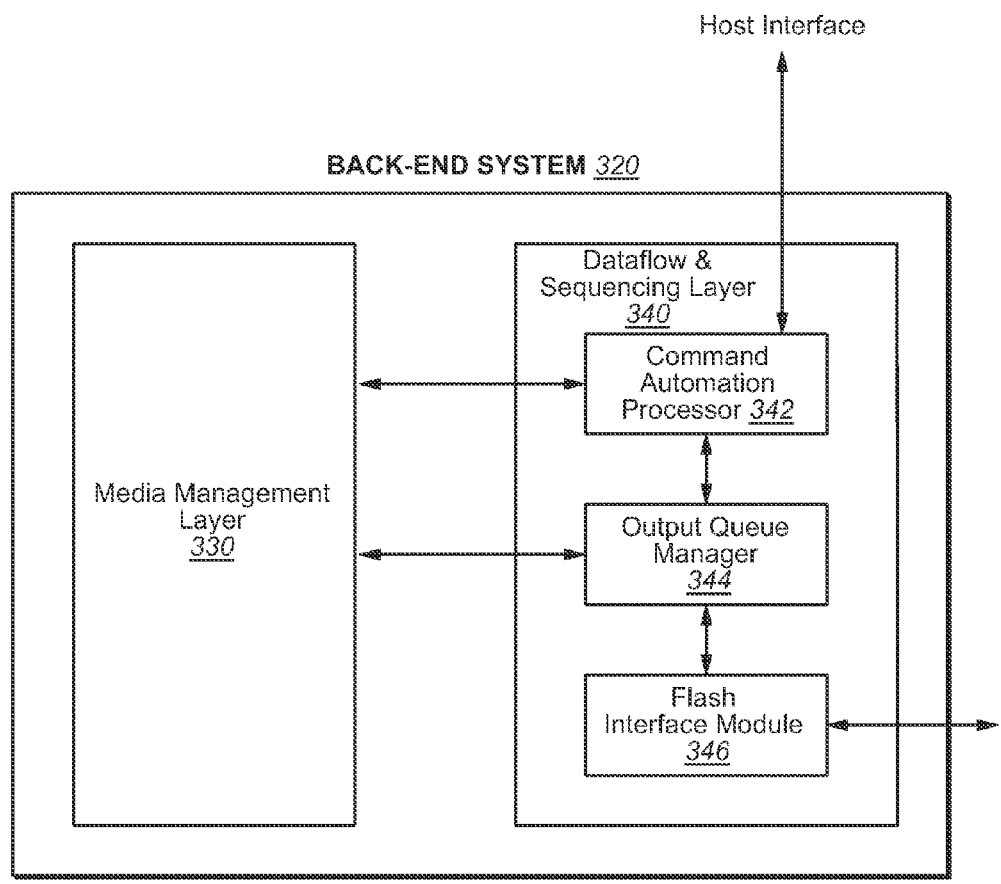
FIG. 9 illustrates the software modules of the back-end system.

FIG. 8 to FIG. 10 illustrate preferred memory and block architectures for implementing the various aspects of the present invention.

Figure 1:
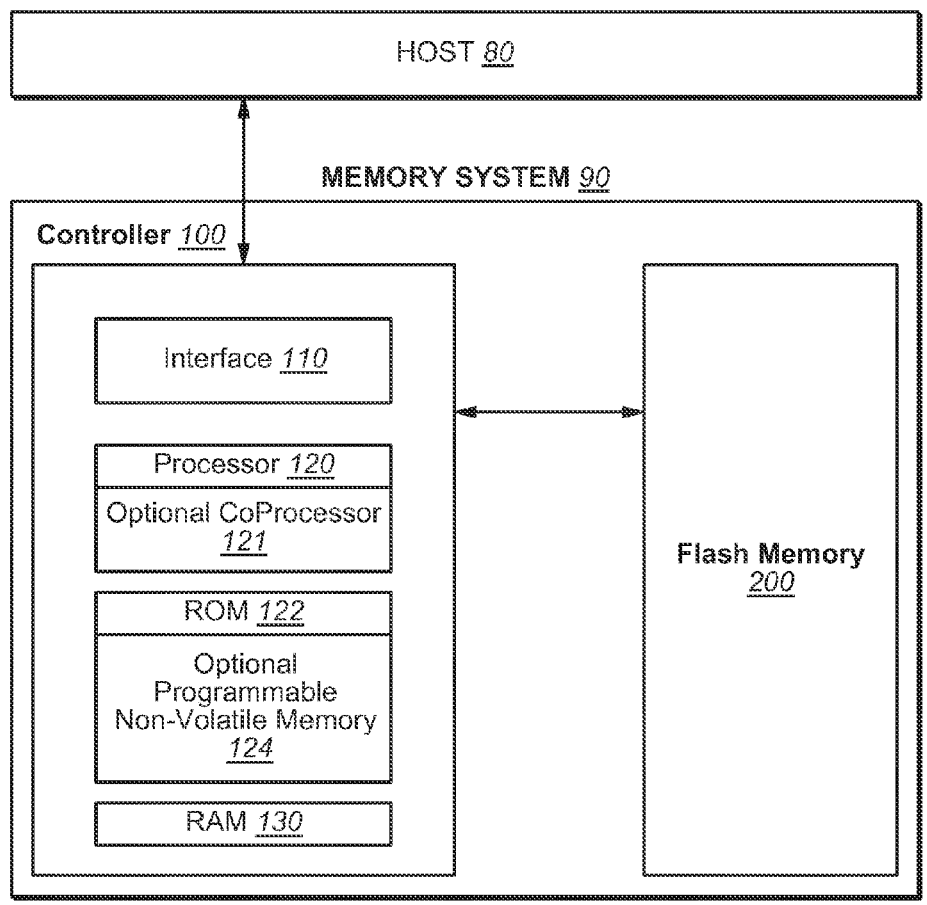
FIG. 1 illustrates schematically the main hardware components of a memory system suitable for implementing the present invention.

FIG. 1 illustrates schematically the main hardware components of a memory system suitable for implementing the present invention. The memory system 90 typically operates with a host 80 through a host interface. The memory system is typically in the form of a memory card or an embedded memory system. The memory system 90 includes a memory 200 whose operations are controlled by a controller 100. The memory 200 comprises of one or more array of non-volatile memory cells distributed over one or more integrated circuit chip. The controller 100 includes an interface 110, a processor 120, an optional coprocessor 121. ROM 122 (read-only-memory), RAM 130 (random access memory) and optionally programmable nonvolatile memory 124. The interface 110 has one component interfacing the controller to a host and another component interfacing to the memory 200. Firmware stored in nonvolatile ROM 122 and/or the optional nonvolatile memory 124 provides codes for the processor 120 to implement the functions of the controller 100. Error correction codes may be processed by the processor 120 or the optional coprocessor 121. In an alternative embodiment, the controller 100 is implemented by a state machine (not shown.) In yet another embodiment, the controller 100 is implemented within the host.

Physical Memory Structure

Figure 2:
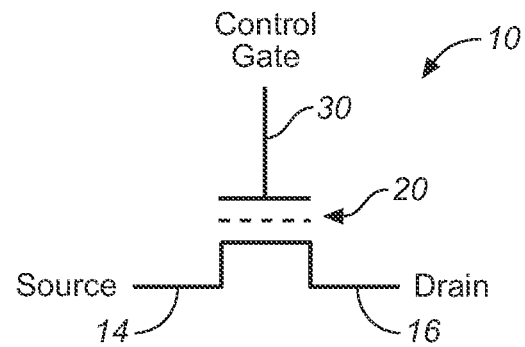
FIG. 2 illustrates schematically a non-volatile memory cell.

FIG. 2 illustrates schematically a non-volatile memory cell. The memory cell 10 can be implemented by a field-effect transistor having a charge storage unit 20, such as a floating gate or a dielectric layer. The memory cell 10 also includes a source 14, a drain 16, and a control gate 30.

There are many commercially successful non-volatile solid-state memory devices being used today. These memory devices may employ different types of memory cells, each type having one or more charge storage element.

Typical non-volatile memory cells include EEPROM and flash EEPROM. Examples of EEPROM cells and methods of manufacturing them are given in U.S. Pat. No. 5,595,924. Examples of flash EEPROM cells, their uses in memory systems and methods of manufacturing them are given in U.S. Pat. Nos. 5,070,032, 5,095,344, 5,315,541, 5,343,063, 5,661,053, 5,313,421 and 6,222,762. In particular, examples of memory devices with NAND cell structures are described in U.S. Pat. Nos. 5,570,315, 5,903,495, 6,046,935. Also, examples of memory devices utilizing dielectric storage element have been described by Eitan et al., "NROM: A Novel Localized Trapping, 2-Bit Nonvolatile Memory Cell," IEEE Electron Device Letters, vol. 21, no. 11. November 2000, pp. 543-545, and in U.S. Pat. Nos. 5,768,192 and 6,011,725.

In practice, the memory state of a cell is usually read by sensing the conduction current across the source and drain electrodes of the cell when a reference voltage is applied to the control gate. Thus, for each given charge on the floating gate of a cell, a corresponding conduction current with respect to a fixed reference control gate voltage may be detected. Similarly, the range of charge programmable onto the floating gate defines a corresponding threshold voltage window or a corresponding conduction current window.

Alternatively, instead of detecting the conduction current among a partitioned current window, it is possible to set the threshold voltage for a given memory state under test at the control gate and detect if the conduction current is lower or higher than a threshold current. In one implementation the detection of the conduction current relative to a threshold current is accomplished by examining the rate the conduction current is discharging through the capacitance of the bit line.

Figure 3:
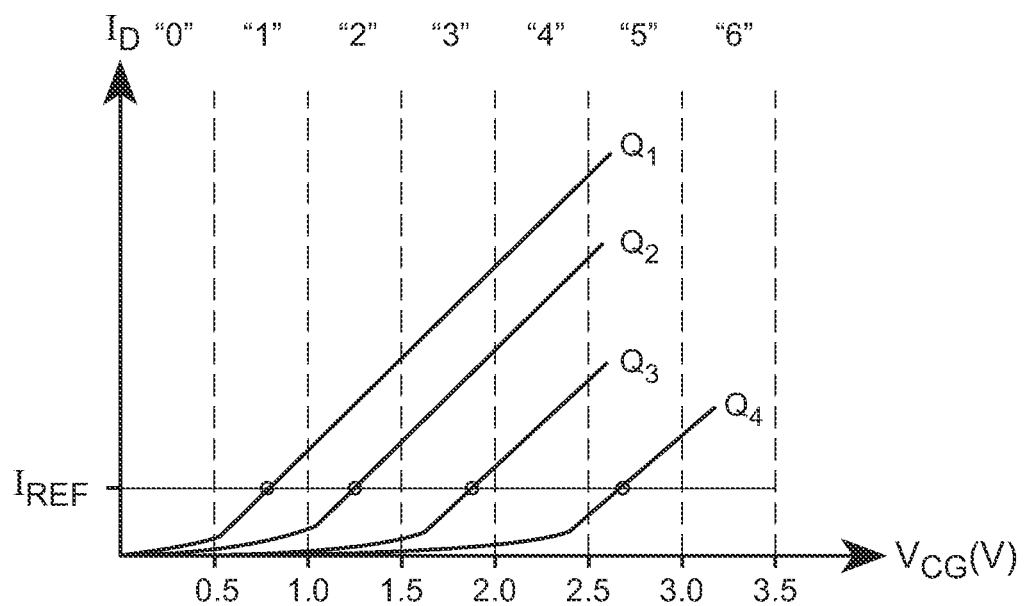
FIG. 3 illustrates the relation between the source-drain current $I_D$ and the control gate voltage $V_{CG}$ for four different charges Q1-Q4 that the floating gate may be selectively storing at any one time.

FIG. 3 illustrates the relation between the source-drain current $I_D$ and the control gate voltage $V_{CG}$ for four different charges Q1-Q4 that the floating gate may be selectively storing at any one time. The four solid $I_D$ versus $V_{CG}$ curves represent four possible charge levels that can be programmed on a floating gate of a memory cell, respectively corresponding to four possible memory states. As an example, the threshold voltage window of a population of cells may range from 0.5V to 3.5V. Seven possible memory states "0", "1", "2", "3", "4". "5". "6", respectively representing one erased and six programmed states may be demarcated by partitioning the threshold window into five regions in interval of 0.5V each. For example, if a reference current, IREF of 2 µA is used as shown, then the cell programmed with Q1 may be considered to be in a memory state "1" since its curve intersects with $I_{REF}$ in the region of the threshold window demarcated by VCG=0.5V and 1.0V. Similarly, Q4 is in a memory state "5".

As can be seen from the description above, the more states a memory cell is made to store, the more finely divided is its threshold window. For example, a memory device may have memory cells having a threshold window that ranges from −1.5V to 5V. This provides a maximum width of 6.5V. If the memory cell is to store 16 states, each state may occupy from 200 mV to 300 mV in the threshold window. This will require higher precision in programming and reading operations in order to be able to achieve the required resolution.

Figure 4A:
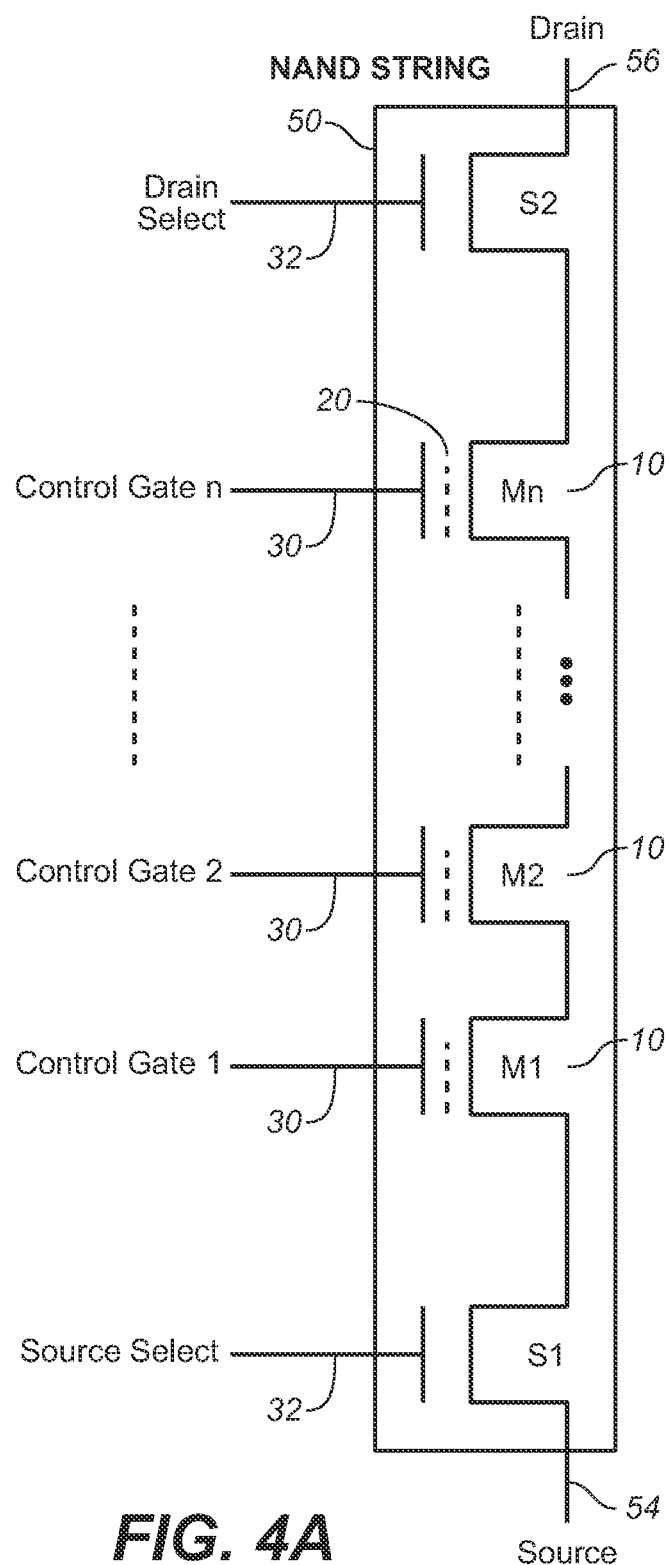
FIG. 4A illustrates schematically a string of memory cells organized into an NAND string.

FIG. 4A illustrates schematically a string of memory cells organized into an NAND string. An NAND string 50 comprises of a series of memory transistors M1, M2, ... Mn (e.g., n=4, 8, 16 or higher) daisy-chained by their sources and drains. A pair of select transistors S1, S2 controls the memory transistors chain's connection to the external via the NAND string's source terminal 54 and drain terminal 56 respectively. In a memory array, when the source select transistor S1 is turned on, the source terminal is coupled to a source line (see FIG. 4B). Similarly, when the drain select transistor S2 is turned on, the drain terminal of the NAND string is coupled to a bit line of the memory array. Each memory transistor 10 in the chain acts as a memory cell. It has a charge storage element 20 to store a given amount of charge so as to represent an intended memory state. A control gate 30 of each memory transistor allows control over read and write operations. As will be seen in FIG. 4B, the control gates 30 of corresponding memory transistors of a row of NAND string are all connected to the same word line. Similarly, a control gate 32 of each of the select transistors S1, S2 provides control access to the NAND string via its source terminal 54 and drain terminal 56 respectively. Likewise, the control gates 32 of corresponding select transistors of a row of NAND string are all connected to the same select line.

When an addressed memory transistor 10 within an NAND string is read or is verified during programming, its control gate 30 is supplied with an appropriate voltage. At the same time, the rest of the non-addressed memory transistors in the NAND string 50 are fully turned on by application of sufficient voltage on their control gates. In this way, a conductive path is effective created from the source of the individual memory transistor to the source terminal 54 of the NAND string and likewise for the drain of the individual memory transistor to the drain terminal 56 of the cell. Memory devices with such NAND string structures are described in U.S. Pat. Nos. 5,570,315, 5,903,495, 6,046,935.

Figure 4B:
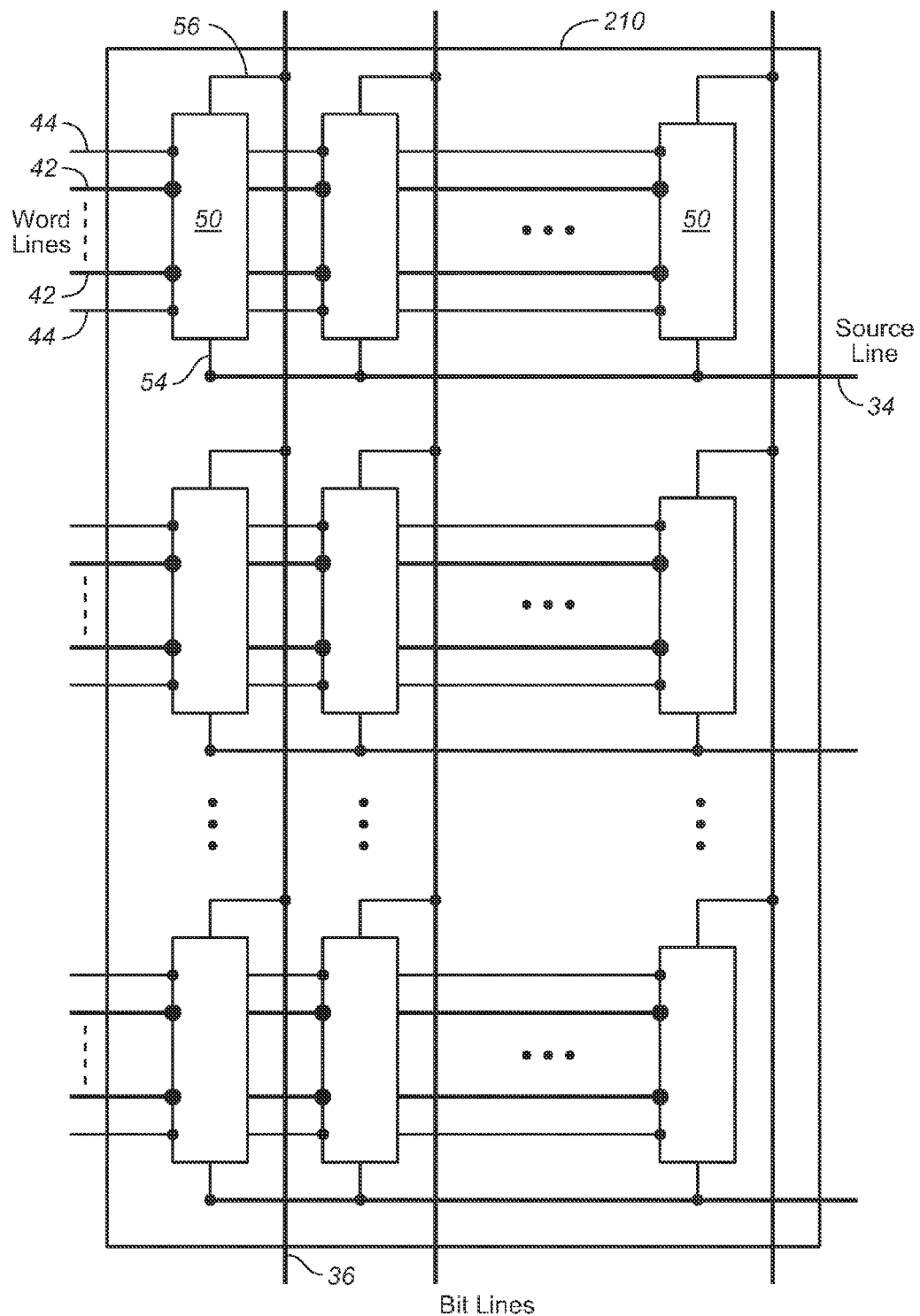
FIG. 4B illustrates an example of an NAND array 210 of memory cells, constituted from NAND strings 50 such as that shown in FIG. 4A.

FIG. 4B illustrates an example of an NAND array 210 of memory cells, constituted from NAND strings 50 such as that shown in FIG. 4A. Along each column of NAND strings, a bit line such as bit line 36 is coupled to the drain terminal 56 of each NAND string. Along each bank of NAND strings, a source line such as source line 34 is couple to the source terminals 54 of each NAND string. Also the control gates along a row of memory cells in a bank of NAND strings are connected to a word line such as word line 42. The control gates along a row of select transistors in a bank of NAND strings are connected to a select line such as select line 44. An entire row of memory cells in a bank of NAND strings can be addressed by appropriate voltages on the word lines and select lines of the bank of NAND strings. When a memory transistor within a NAND string is being read, the remaining memory transistors in the string are turned on hard via their associated word lines so that the current flowing through the string is essentially dependent upon the level of charge stored in the cell being read.

Figure 5:
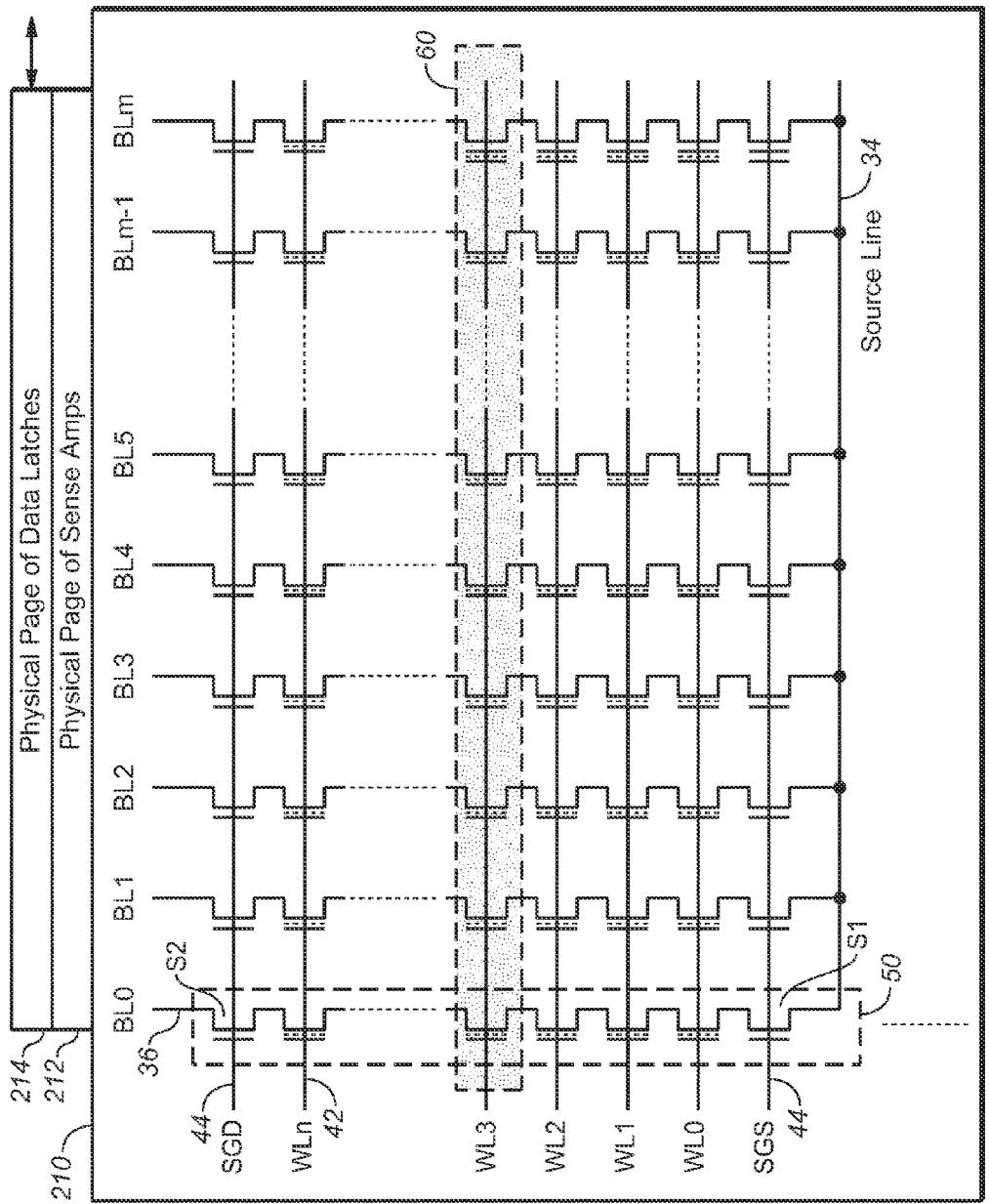
FIG. 5 illustrates a page of memory cells, organized for example in the NAND configuration, being sensed or programmed in parallel.

FIG. 5 illustrates a page of memory cells, organized for example in the NAND configuration, being sensed or programmed in parallel. FIG. 5 essentially shows a bank of NAND strings 50 in the memory array 210 of FIG. 4B, where the detail of each NAND string is shown explicitly as in FIG. 4A. A "page" such as the page 60, is a group of memory cells enabled to be sensed or programmed in parallel. This is accomplished by a corresponding page of sense amplifiers 212. The sensed results are latches in a corresponding set of latches 214. Each sense amplifier can be coupled to a NAND string via a bit line. The page is enabled by the control gates of the cells of the page connected in common to a word line 42 and each cell accessible by a sense amplifier accessible via a bit line 36. As an example, when respectively sensing or programming the page of cells 60, a sensing voltage or a programming voltage is respectively applied to the common word line WL3 together with appropriate voltages on the bit lines.

Physical Organization of the Memory

One important difference between flash memory and of type of memory is that a cell must be programmed from the erased state. That is the floating gate must first be emptied of charge. Programming then adds a desired amount of charge back to the floating gate. It does not support removing a portion of the charge from the floating to go from a more programmed state to a lesser one. This means that update data cannot overwrite existing one and must be written to a previous unwritten location.

Furthermore erasing is to empty all the charges from the floating gate and generally takes appreciably time. For that reason, it will be cumbersome and very slow to erase cell by cell or even page by page. In practice, the array of memory cells is divided into a large number of blocks of memory cells. As is common for flash EEPROM systems, the block is the unit of erase. That is, each block contains the minimum number of memory cells that are erased together. While aggregating a large number of cells in a block to be erased in parallel will improve erase performance, a large size block also entails dealing with a larger number of update and obsolete data. Just before the block is erased, a garbage collection is required to salvage the non-obsolete data in the block.

Each block is typically divided into a number of pages. A page is a unit of programming or reading. In one embodiment, the individual pages may be divided into segments and the segments may contain the fewest number of cells that are written at one time as a basic programming operation. One or more pages of data are typically stored in one row of memory cells. A page can store one or more sectors. A sector includes user data and overhead data. Multiple blocks and pages distributed across multiple arrays can also be operated together as metablocks and metapages. If they are distributed over multiple chips, they can be operated together as megablocks and megapage.

Examples of Multi-Level Cell ("MLC") Memory Partitioning

A nonvolatile memory in which the memory cells each stores multiple bits of data has already been described in connection with FIG. 3. A particular example is a memory formed from an array of field-effect transistors, each having a charge storage layer between its channel region and its control gate. The charge storage layer or unit can store a range of charges, giving rise to a range of threshold voltages for each field-effect transistor. The range of possible threshold voltages spans a threshold window. When the threshold window is partitioned into multiple sub-ranges or zones of threshold voltages, each resolvable zone is used to represent a different memory states for a memory cell. The multiple memory states can be coded by one or more binary bits. For example, a memory cell partitioned into four zones can support four states which can be coded as 2-bit data. Similarly, a memory cell partitioned into eight zones can support eight memory states which can be coded as 3-bit data, etc.

All-Bit, Full-Sequence MLC Programming

Figure 6:
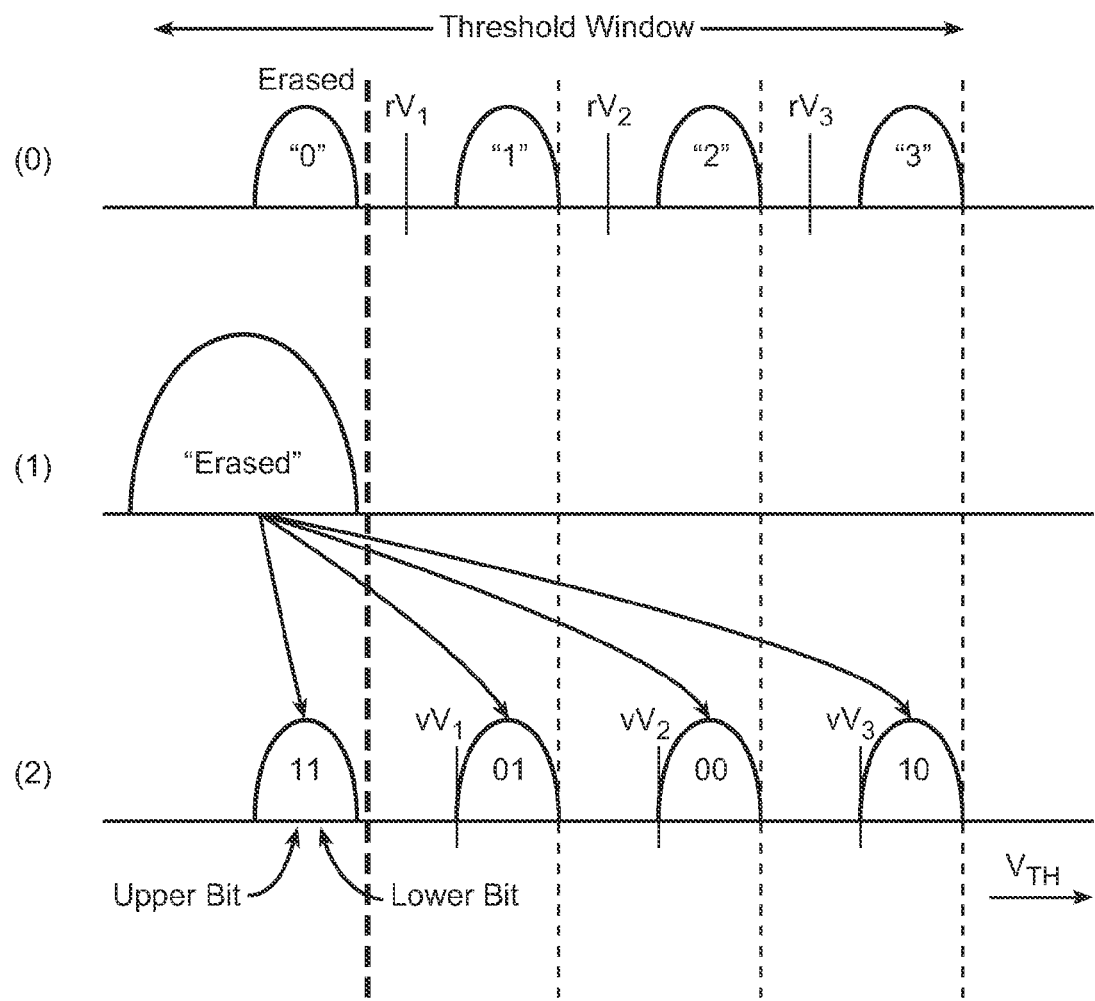
FIG. 6(0)-6(2) illustrate an example of programming a population of 4-state memory cells.

FIG. 6(0)-6(2) illustrate an example of programming a population of 4-state memory cells. FIG. 6(0) illustrates the population of memory cells programmable into four distinct distributions of threshold voltages respectively representing memory states "0", "1", "2" and "3". FIG. 6(1) illustrates the initial distribution of "erased" threshold voltages for an erased memory. FIG. 6(2) illustrates an example of the memory after many of the memory cells have been programmed. Essentially, a cell initially has an "erased" threshold voltage and programming will move it to a higher value into one of the three zones demarcated by verify levels $vV_1$, $vV_2$ and $vV_3$. In this way, each memory cell can be programmed to one of the three programmed state "1", "2" and "3" or remain un-programmed in the "erased" state. As the memory gets more programming, the initial distribution of the "erased" state as shown in FIG. 6(1) will become narrower and the erased state is represented by the "0" state.

A 2-bit code having a lower bit and an upper bit can be used to represent each of the four memory states. For example, the "0", "1", "2" and "3" states are respectively represented by "11", "01", "00" and '10". The 2-bit data may be read from the memory by sensing in "full-sequence" mode where the two bits are sensed together by sensing relative to the read demarcation threshold values $rV_1$, $rV_2$ and $rV_3$ in three sub-passes respectively.

Bit-by-Bit MLC Programming and Reading

Figure 7A:
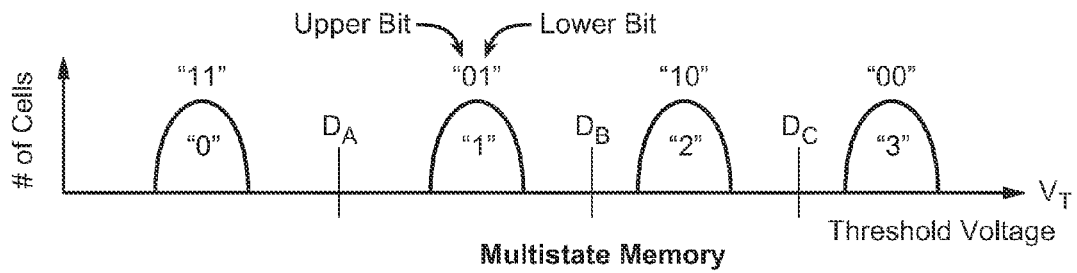
FIGS. 7A-7E illustrate the programming and reading of the 4-state memory encoded with a given 2-bit code.

FIGS. 7A-7E illustrate the programming and reading of the 4-state memory encoded with a given 2-bit code. FIG. 7A illustrates threshold voltage distributions of the 4-state memory array when each memory cell stores two bits of data using the 2-bit code. Such a 2-bit code has been disclosed in U.S. Pat. No. 7,057,939.

Figure 7B:
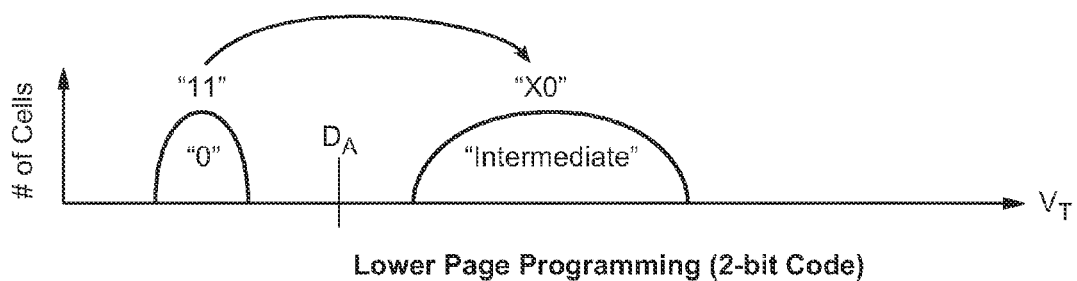

FIG. 7B illustrates the lower page programming (lower bit) in a 2-pass programming scheme using the 2-bit code. The fault-tolerant LM New code essentially avoids any upper page programming to transit through any intermediate states. Thus, the first pass lower page programming has the logical state (upper bit, lower bit)=(1, 1) transits to some intermediate state (x, 0) as represented by programming the "unprogrammed" memory state "0" to the "intermediate" state designated by (x, 0) with a programmed threshold voltage greater than $D_A$ but less than $D_C$.

Figure 7C:
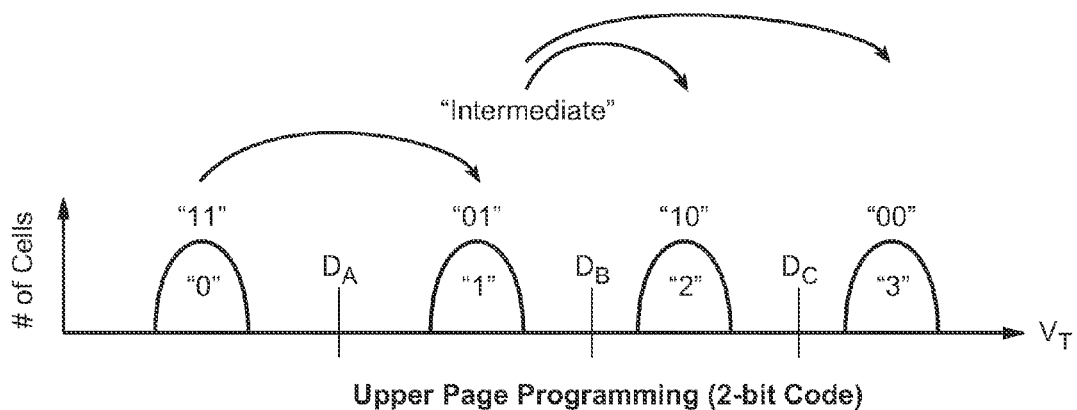

FIG. 7C illustrates the upper page programming (upper bit) in the 2-pass programming scheme using the 2-bit code. In the second pass of programming the upper page bit to "0", if the lower page bit is at "1", the logical state (1, 1) transits to (0, 1) as represented by programming the "unprogrammed" memory state "0" to "1". If the lower page bit is at "0", the logical state (0, 0) is obtained by programming from the "intermediate" state to "3". Similarly, if the upper page is to remain at "1", while the lower page has been programmed to "0", it will require a transition from the "intermediate" state to (1, 0) as represented by programming the "intermediate" state to "2".

Figure 7D:
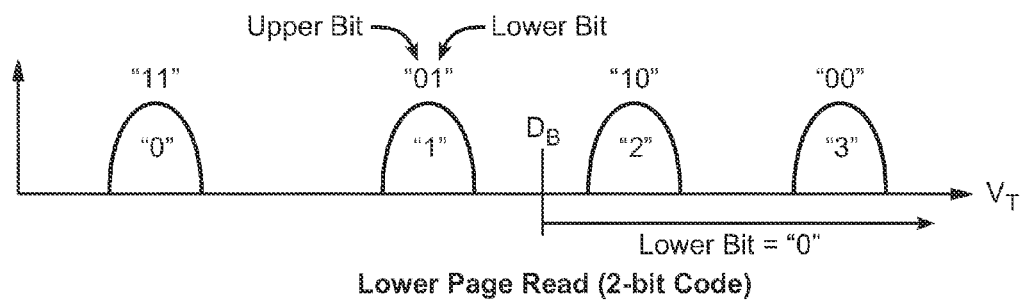

FIG. 7D illustrates the read operation that is required to discern the lower bit of the 4-state memory encoded with the 2-bit code. A readB operation is first performed to determine if the LM flag can be read. If so, the upper page has been programmed and the readB operation will yield the lower page data correctly. On the other hand, if the upper page has not yet been programmed, the lower page data will be read by a readA operation.

Figure 7E:
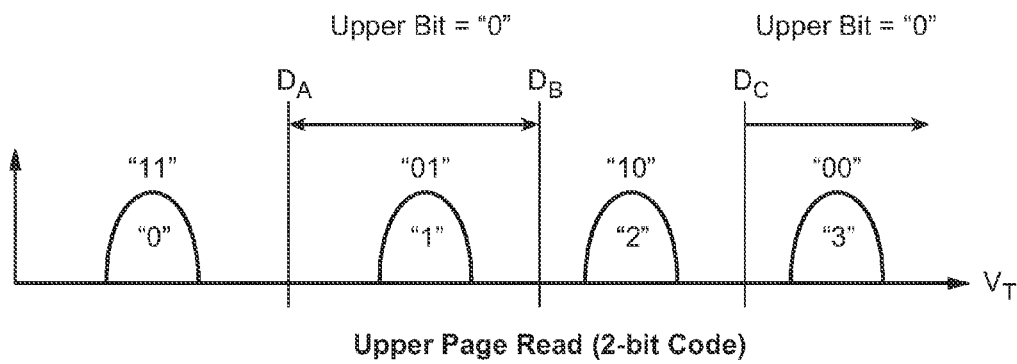

FIG. 7E illustrates the read operation that is required to discern the upper bit of the 4-state memory encoded with the 2-bit code. As is clear from the figure, the upper page read will require a 3-pass read of readA, readB and readC, respectively relative to the demarcation threshold voltages $D_A$, $D_B$ and $D_C$.

In the bit-by-bit scheme for a 2-bit memory, a physical page of memory cells will store two logical data pages, a lower data page corresponding to the lower bit and an upper data page corresponding to the upper bit.

Binary and MLC Memory Partitioning

FIG. 6 and FIG. 7 illustrate examples of a 2-bit (also referred to as "D2") memory. As can be seen, a D2 memory has its threshold range or window partitioned into 4 regions, designating 4 states. Similarly, in D3, each cell stores 3 bits (low, middle and upper bits) and there are 8 regions. In D4, there are 4 bits and 16 regions, etc. As the memory's finite threshold window is partitioned into more regions, the resolution and for programming and reading will necessarily become finer. Two issues arise as the memory cell is configured to store more bits.

First, programming or reading will be slower when the threshold of a cell must be more accurately programmed or read. In fact in practice the sensing time (needed in programming and reading) tends to increase as the square of the number of partitioning levels.

Secondly, flash memory has an endurance problem as it ages with use. When a cell is repeatedly programmed and erased, charges is shuttled in and out of the floating gate 20 (see FIG. 2) by tunneling across a dielectric. Each time some charges may become trapped in the dielectric and will modify the threshold of the cell. In fact over use, the threshold window will progressively narrow. Thus, MLC memory generally is designed with tradeoffs between capacity, performance and reliability.

Conversely, it will be seen for a binary memory, the memory's threshold window is only partitioned into two regions. This will allow a maximum margin of errors. Thus, binary partitioning while diminished in storage capacity will provide maximum performance and reliability.

The multi-pass, bit-by-bit programming and reading technique described in connection with FIG. 7 provides a smooth transition between MLC and binary partitioning. In this case, if the memory is programmed with only the lower bit, it is effectively a binary partitioned memory. While this approach does not fully optimize the range of the threshold window as in the case of a single-level cell ("SLC") memory, it has the advantage of using the same demarcation or sensing level as in the operations of the lower bit of the MLC memory. As will be described later, this approach allows a MLC memory to be "expropriated" for use as a binary memory, or vice versa. How it should be understood that MLC memory tends to have more stringent specification for usage.

Binary Memory and Partial Page Programming

The charge programmed into the charge storage element of one memory cell produces an electric field that perturbs the electric field of a neighboring memory cell. This will affect the characteristics of the neighboring memory cell which essentially is a field-effect transistor with a charge storage element. In particular, when sensed the memory cell will appear to have a higher threshold level (or more programmed) than when it is less perturbed.

In general, if a memory cell is program-verified under a first field environment and later is read again under a different field environment due to neighboring cells subsequently being programmed with different charges, the read accuracy may be affected due to coupling between neighboring floating gates in what is referred to as the "Yupin Effect". With ever higher integration in semiconductor memories, the perturbation of the electric field due to the stored charges between memory cells (Yupin effect) becomes increasing appreciable as the inter-cellular spacing shrinks.

The Bit-by-Bit MLC Programming technique described in connection with FIG. 7 above is designed to minimize program disturb from cells along the same word line. As can be seen from FIG. 7B, in a first of the two programming passes, the thresholds of the cells are moved at most half way up the threshold window. The effect of the first pass is overtaken by the final pass. In the final pass, the thresholds are only moved a quarter of the way. In other words, for D2, the charge difference among neighboring cells is limited to a quarter of its maximum. For D3, with three passes, the final pass will limit the charge difference to one-eighth of its maximum.

However, the bit-by-bit multi-pass programming technique will be compromised by partial-page programming. A page is a group of memory cells, typically along a row or word line, that is programmed together as a unit. It is possible to program non overlapping portions of a page individually over multiple programming passes. However, owning to not all the cells of the page are programmed in a final pass together, it could create large difference in charges programmed among the cells after the page is done. Thus partial-page programming would result in more program disturb and would require a larger margin for sensing accuracy.

In the case the memory is configured as binary memory, the margin of operation is wider than that of MLC. In the preferred embodiment, the binary memory is configured to support partial-page programming in which non-overlapping portions of a page may be programmed individually in one of the multiple programming passes on the page. The programming and reading performance can be improved by operating with a page of large size. However, when the page size is much larger than the host's unit of write (typically a 512-byte sector), its usage will be inefficient. Operating with finer granularity than a page allows more efficient usage of such a page.

The example given has been between binary versus MLC. It should be understood that in general the same principles apply between a first memory with a first number of levels and a second memory with a second number of levels more than the first memory.

Logical and Physical Block Structures

FIG. 8 illustrates the memory being managed by a memory manager with is a software component that resides in the controller. The memory 200 is organized into blocks, each block of cells being a minimum unit of erase. Depending on implementation, the memory system may operate with even large units of erase formed by an aggregate of blocks into "metablocks" and also "megablocks". For convenience the description will refer to a unit of erase as a metablock although it will be understood that some systems operate with even larger unit of erase such as a "megablock" formed by an aggregate of metablocks.

The host 80 accesses the memory 200 when running an application under a file system or operating system. Typically, the host system addresses data in units of logical sectors where, for example, each sector may contain 512 bytes of data. Also, it is usual for the host to read or write to the memory system in unit of logical clusters, each consisting of one or more logical sectors. In some host systems, an optional host-side memory manager may exist to perform lower level memory management at the host. In most cases during read or write operations, the host 80 essentially issues a command to the memory system 90 to read or write a segment containing a string of logical sectors of data with contiguous addresses.

A memory-side memory manager 300 is implemented in the controller 100 of the memory system 90 to manage the storage and retrieval of the data of host logical sectors among metablocks of the flash memory 200. The memory manager comprises a front-end system 310 and a back-end system 320. The front-end system 310 includes a host interface 312. The back-end system 320 includes a number of software modules for managing erase, read and write operations of the metablocks. The memory manager also maintains system control data and directory data associated with its operations among the flash memory 200 and the controller RAM 130.

FIG. 9 illustrates the software modules of the back-end system. The Back-End System mainly comprises two functional modules: a Media Management Layer 330 and a Dataflow and Sequencing Layer 340. The media management layer 330 is responsible for the organization of logical data storage within a flash memory meta-block structure.

The dataflow and sequencing layer 340 is responsible for the sequencing and transfer of sectors of data between a front-end system and a flash memory. This layer includes a command automation processor (CAP) 342 that issues high level commands for execution in the memory chips; an output queue sequencer (OQS) 344 that derives instruction from these high level commands; and a flash interface module (FIM) 346 that issues the series of instructions though the port from the controller circuit to the memory circuits. More details will be provided in following section.

The memory manager 300 is preferably implemented in the controller 100. It translates logical addresses received from the host into physical addresses within the memory array, where the data are actually stored, and then keeps track of these address translations.

Figure 10A:
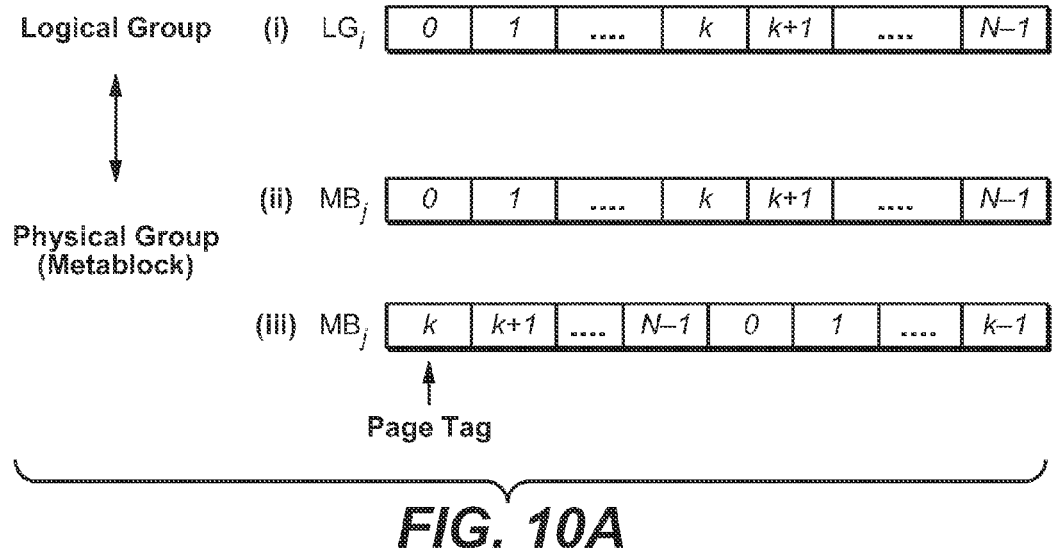
FIGS. 10A(i)-10A(iii) illustrate schematically the mapping between a logical group and a metablock.

FIGS. 10A(i)-10A(iii) illustrate schematically the mapping between a logical group and a metablock. The metablock of the physical memory has N physical sectors for storing N logical sectors of data of a logical group. FIG. 10A(i) shows the data from a logical group $LG_i$, where the logical sectors are in contiguous logical order 0, 1, . . . , N−1. FIG. 10A(ii) shows the same data being stored in the metablock in the same logical order. The metablock when stored in this manner is said to be "sequential." In general, the metablock may have data stored in a different order, in which case the metablock is said to be "non-sequential" or "chaotic."

There may be an offset between the lowest address of a logical group and the lowest address of the metablock to which it is mapped. In this case, logical sector address wraps round as a loop from bottom back to top of the logical group within the metablock. For example, in FIG. 10A(iii), the metablock stores in its first location beginning with the data of logical sector k. When the last logical sector N−1 is reached, it wraps around to sector 0 and finally storing data associated with logical sector k−1 in its last physical sector. In the preferred embodiment, a page tag is used to identify any offset, such as identifying the starting logical sector address of the data stored in the first physical sector of the metablock. Two blocks will be considered to have their logical sectors stored in similar order when they only differ by a page tag.

Figure 10B:
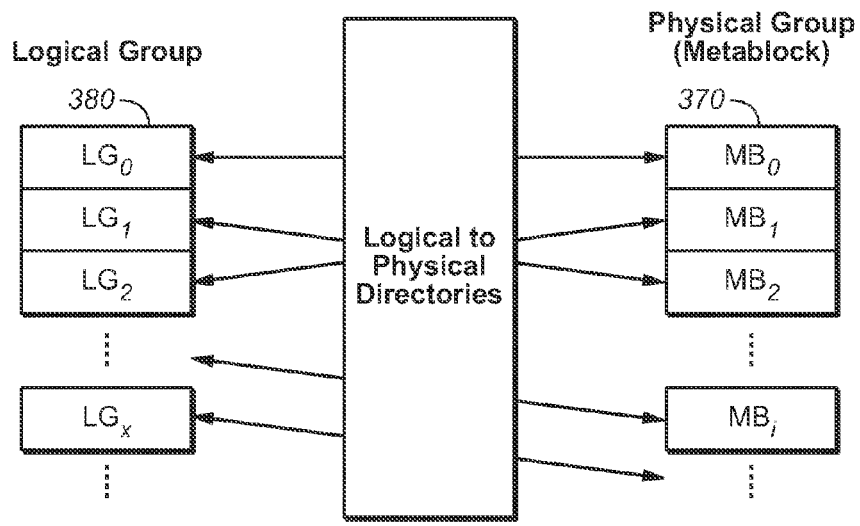
FIG. 10B illustrates schematically the mapping between logical groups and metablocks.

FIG. 10B illustrates schematically the mapping between logical groups and metablocks. Each logical group 380 is mapped to a unique metablock 370, except for a small number of logical groups in which data is currently being updated. After a logical group has been updated, it may be mapped to a different metablock. The mapping information is maintained in a set of logical to physical directories.

These structures are discussed further in U.S. Pat. No. 8,244,960, with other relevant detail presented in US patent publication number US-2010-0318720-A1.

Adaptive Context Disbursement for Improved Performance

This section looks in more detail at the dataflow and sequencing layer (340, FIG. 9) in more detail for the case where a single ported interface is used to manage multiple dies independently. In such a multi-thread system, the timing of one thread can interfere with another thread that is trying to do a write a memory chip's cache. The techniques of this section can help to maximize the efficiency of using a memory's write cache sequence in a multi-threaded system (where the cache involved here is that on the memory circuit, rather than cache on the controller). As non-volatile memory systems become more complex, to more efficiently manage such system the controller can manage the memory die through multiple, largely independent sequences of commands or instructions each corresponding to a subset of the memory die. Although applicable to memory cards, where the number of die are relatively small, such a multi-thread approach can be particularly useful in systems such as solid state drives (SSDs) or embedded memory (such as iNAND).

Although the following discussion may be based on various exemplary embodiments to provide concrete examples, the techniques and structures here can be applied fairly generally to memory systems having a controller and multiple memory circuits that can be independently operated. In addition to the other referenced cited above, theses can include the various memory systems presented in the following US patent, patent publication and application numbers: U.S. Pat. No. 7,480,766; US-2005-0154819-A1; US-2007-0061581-A1; US-2007-0061597-A1; US-2007-0113030-A1; US-2008-0155178-A1; US-2008-0155228-A1; US-2008-0155176-A1; US-2008-0155177-A1; US-2008-0155227-A1; US-2008-0155175-A1; Ser. Nos. 12/348,819; 12/348,825; 12/348,891; 12/348,895; 12/348,899; and 61/142,620.

One way to approach a multi-thread system is through a relatively simplistic timer that can be used to manage a thread during write cache (that is, the writing of data from the controller to a memory circuit's cache); however, a problem with such a simplistic timer is it that moves the data transfer, or toggle, operation to the last possible moment (just before the cached operation in the NAND, or memory, chip is about to finish). A baseline method of implementing a simple timer-based execution of commands would be to lock a thread for a certain time (based on the memory circuit's busy time) and return to it after the timer has expired. The downside of doing this is that the thread may not regain control in order to execute the commands in the pipeline immediately after its timer expires. Another thread executing other operations may be holding the flash interface module (FIM 346, FIG. 9) that sends out the instructions. Consequently, a net result of a simpler timer is lost opportunity for the write cache toggle operation; and that the simple timer can block a thread from doing other operations within a thread if, for example, multiple dies were attached to the thread.

Prior NAND flash system that have used NAND write cache were non-threaded and would poll cache busy before toggling, then poll cache busy before checking the status. The introduction of architectures that treat all the dies independently create more complexity in managing write cache. The purpose of flash write cache is to overlap the write data toggles to the flash memory with the flash programming time. By using a more complex state machine with timers, the window of opportunity can be opened for the write toggle operation to enter to the flash during a cache operation. Creating a window for the toggle operation increases the performance in a multithreaded system by providing an earlier opportunity for the write toggle to take place.

In the exemplary embodiment, the state machine is driven by a series of timers (that track the opportunity window, the pending cache operation, and the cache busy time) and by feedback from the FIM to drive the timers. The result of the timer logic creates a window within which the write toggle can start. The window of opportunity exists for all threads, and for all dies in a thread. The benefit of this approach benefits both a single die per thread and the case of multiple dies per thread.

In case of a stream of writes, each thread in a multi-threaded system will have a window of opportunity during which a subsequent write command can arrive and be executed in the flash interface module. This helps to maximize saving in the data transfer time. A timer can be maintained for each thread and this determines when the thread can wake up to execute the next command. If the write contexts are setup by the system, and the timer is set to 0 us, then this write command can be executed any time the thread regains control. This happens when the other threads are either busy, they do not have any on-going operations, or if the thread is yielded to through thread arbitration schemes, where examples of thread arbitration conditions include request priority, ordered execution, available resources, and so on. The window of opportunity is a deterministic value: based up on the flash busy time (which can vary for upper page and lower page) and the time to generate the status check contexts. The generation of events at appropriate times leads to the creation of an opportunity window, as illustrated in FIG. 11.

Figure 11:
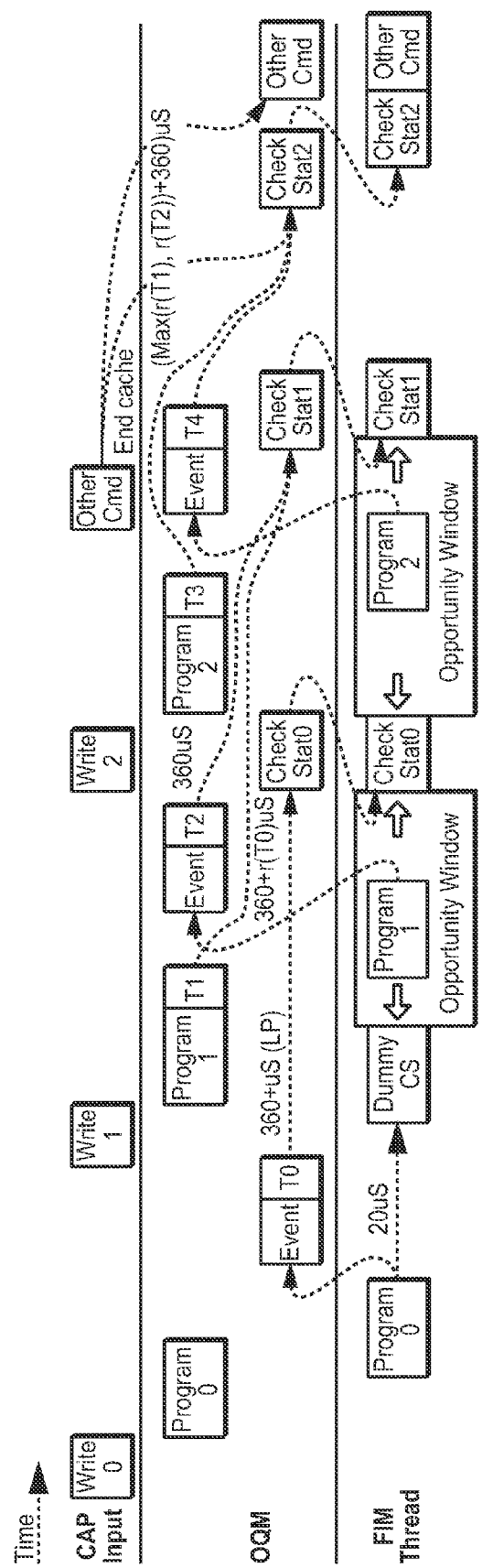
FIG. 11 is a diagram illustrating the timing and interaction of some of the controller modules involved in issuing commands to the memory die.

In FIG. 11, the top portion (above the upper horizontal line) is the CAP input, where CAP is the command automation processor that issue high level commands for execution in the memory circuits, generating the contexts and feeding them to the OQM. The bottom portion (below the lower horizontal line) is the flash interface module (FIM) thread, that are the series of instructions derived from the high level commands issued in sequence by the port the memory circuits. Between the horizontal lines is the output queue manager (OQM), the module that interfaces to the FIM and manages the timers and the context releasing. By gating the release of the context the FIM arbiter cannot execute the contexts or, in other words, communicate with that die. The OQM allows context reordering. The middle section is split into two lines for clarity, although both correspond to the OQM.

FIG. 11 looks at the process for one of the threads for one of its chip for the example of a series of write operations. In this example, the CAP input is a set of three write commands (Write 0, Write 1, Write 2) to the chip followed by some other command (Other Cmd) that will not require the chip's cache that is executed to end the cache sequence. In the center are the corresponding instructions (Program 0, Program 1, Program 2) derived from the high level commands, along with a Check Status for each of these operations and the Other Cmd instruction. The check status is used to check for true/cache ready, so that controller can do an associative command, where an associative command can be a program status or read toggle. These associative commands are preceded by a check status command to ensure that the die is ready for the next operation. The queue manager (OQM) also has several timers for this chip/thread and events that can trigger these. It is these timers that determine when the queue manager transfers these instructions to the memory interface module (FIM) to pass on to the memory die. On the FIM thread is the correspond series of programs, status checks, and other command. In the example of FIG. 11 a number of exemplary time values are given for lower page (LP) and upper page (UP) to provide a general idea of the times involved, but the actual times used can be based on the device characteristics (i.e., programming times on the memory device) and FIG. 11 is not to be accurate with respect to the time scale.

Beginning with Write 0, which can be for one or more pages, is translated to Program 0 and sent out to the memory, this lead to a thread switch and sets a FPS (Flash Protocol Sequencer) timer for, in this example) 20 uS (corresponding to a lower page cache busy). This FIM event also triggers OQM timer T0, here taken as LP=360 uS for a lower page, 2.1 mS for an upper page. T0 and the other timers control the release of the contexts to the FIM. After the contexts are made available to the FIM, they are placed in the pool of possible threads that can be arbitrated in the thread yield process. Timer T0 will determine when to issue Check Stat 0, the status check for Program 0, from the queue manager to the FIM thread. Meanwhile, back at the FIM thread, there will be a thread switch, with the FPS Thread timer=0 uS. When the timer expires the contexts get released. The thread is not forced to execute, but the thread has the possibility to be executed, depending on the FIM arbiter. Here a check status (Dummy CS) and marks the beginning of an "opportunity window" within which Program 1 can be issued. When Program 1 is sent to the OQM, a timer T1 is started. The CAP firmware can take the remaining time from T0 (r(T0)) and add the expected Program 1 time. When the FIM thread issues Program 1, this event then starts a timer T2.

Concerning the "opportunity window", this window allows for the sliding of an operation for the convenience of other die's operations on the thread. In this example, the program can slide around the window with a memory write cache command sequence. If a read cache is being performed, then the read command operations have the ability to slide around the opportunity window In the example shown here, the window size is 340 uS (for a lower page) or 900 uS (for an upper page). More detail on the "opportunity window" arrangement is given in U.S. patent application Ser. No. 14/063,637, filed on Nov. 25, 2013.

The timing of the check status operation Check Stat 0 is dependent upon the operation of Program 1 (lower page vs. upper page). If Program 1 is a lower page, the Check Stat 0 can be 20 uS after Program 0 finishes. If Program 1 is an upper page, then Check Stat 0 would be (again, in this example) 1.2 mS after Program 0 finishes. Alternatively, at the end of Program 1, the FPS thread timer can be used to block this thread from returning (including executing operations on other dies within this thread). As a result of this, the OQM timer could be read-modify-write, with the time updated to include the cache busy time as a result of the Program 1 operation. In any case, Check Stat 0 is then issued to the FIM thread, allowing the opportunity window for Program 2 to open if the die is ready.

In this embodiment, a timer T3 is started by the queue manager for Program 2. This covers the case that Program 1 finished beyond its window. When Program 2 is sent to the queue manager, the CAP firmware can take the maximum remainder of T1 and T2+the Program 2 time (360 uS) ((Max (r(T1),r(T2))+360)uS) for T3. A time T4 is then triggered by the event of the FIM thread sending out Program 2.

The Check Stat 1 context is released when both T1 and T2 finish. Similarly to with Check Stat 0, for Check Stat 1 T1 or T2 can be modified to include the cache busy time for program 2. When both of the T3 and T4 event timers finish, then the Check Status 2 context can be released. Unlike for Check Stat 0 and Check Stat 1, Write 2 does not need to be modified, since there is no more cache busy from cache operations, the Other Cmd ending the cache sequence.

In FIG. 11, the Program 1 (the toggle operation), can slide left and right within the corresponding "opportunity window" box. Allowing the toggle operation to slide left and right in the timing window allows the toggle to take place earlier, and gives it a higher probability of being completed before the FIM resource gets used by another thread. If a new write request comes in before the opportunity window timer expires, the system releases the transfer command and write command contexts and the window of write cache opportunity timer is reset to 0. If the window timer expires before a new request or the next command is not a write command then the system will issue a reset on that thread to terminate the write cache sequence. As described further in U.S. patent application Ser. No. 14/063,637, using the "opportunity window" maximizes the ability hide the data transfer by allowing a thread to execute the command contexts whenever the flash (die) is ready.

Figure 12:
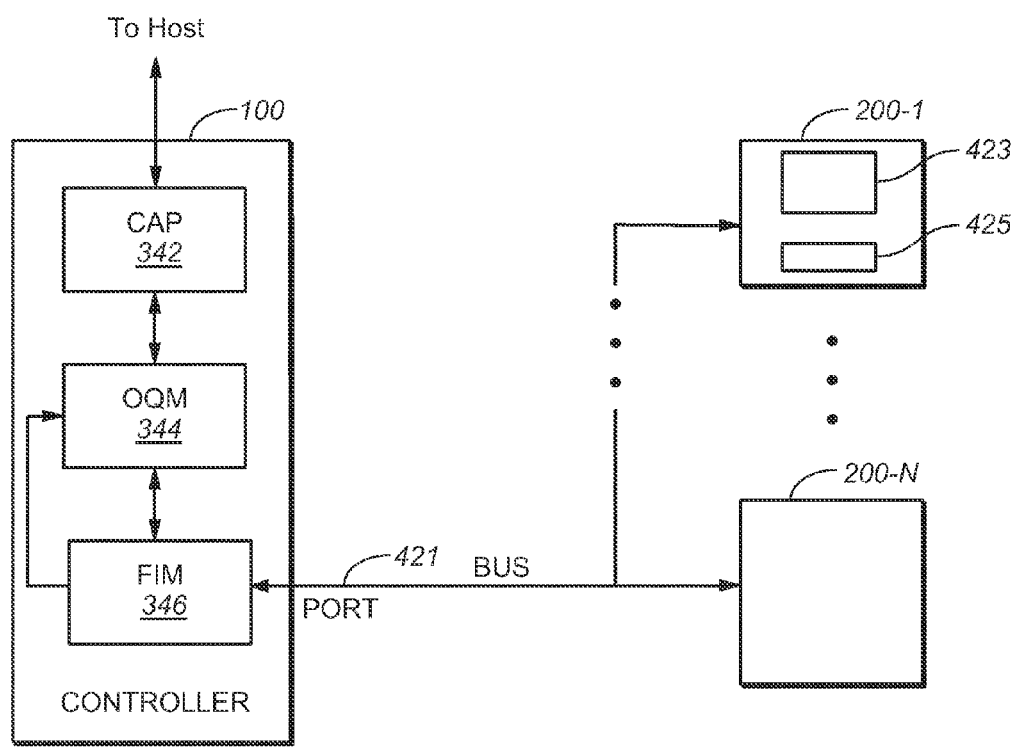
FIG. 12 is a box diagram of some the memory system elements relevant to the process of FIG. 11.

FIG. 12 is a box diagram of some of the basic elements involved in the process of FIG. 11. Within the controller 100 are the CAP 342, OQM 344, and FIM 346, described previously with respect to FIG. 9, but incorporating the timers described with respect to FIG. 11. Depending on the embodiment, these modules can be variously implemented in hardware, firmware, software, or various combinations of these. For example, the interface module FIM 346 may implemented in hardware, functioning much as a FIFO in which the instructions of the various threads are stacked up, while the higher level CAP 342 and queue manager 344 are implemented by firmware.

The instructions are then sent out by the port of the controller along the bus structure 421 that would have the various data, command, ready/bus, and other lines typical to such structures. The N memory circuits chips 200-1 to 2000-N can be treated by multiple threads, each for one or more chips. On each of the chips is shown an array 423 and cache 425, where a single chip may have more than a single array. A number of architectures are available for the CAP 342, OQM 344, and FIM 346 and the degree to which these are shared between, or distinct to, the different threads. For example, each thread could have its own set of these elements; or the CAP 342 and OQM 344 could be shared, with each thread having its own FIM 346. In the exemplary embodiment, all of these are shared (to reduce die cost), but it is not required. At the end of this process, there is basically a huge pile of RAM where each thread has a series of operations waiting in the form of contexts. The pile of RAM, coupled with the fact that each of these operations (read/write/erase) takes time to execute is what gives the parallelism such that the arbiter of the memory interface module has more than one thread to choose from.

For any of these variations, the arrangement can help to improve performance since under prior implementation the controller would poll the memory chips, but only after waiting for the time set aside for the operation (such as 360 uS for a lower page write), whereas in practice memory cache operation times can be relatively unpredictable as they depend on the preceding cache operation on the memory device and also on bus dynamics. The use of timers in this way described above to check the status of the last operation can help to reduce cumulative operating as the controller can check the status when ready. This can be particularly useful as operation times, such as for a program or sense operation, vary over a memory chips lifetime, for example by getting faster. Also, it should again be noted that although described primary in the context of data write operations, similar arrangements can also be used for sensing and other operations involving the memory cache.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

It is claimed:

1. A controller circuit for a memory system including the controller circuit and one or more memory circuits, in which the controller circuit controls the transfer of data between the memory circuits and a host connected to the memory system and manages the storage of data on the memory circuits, the controller circuit comprising:
 a port by which the controller circuit is connectable to the one or more memory circuits through a bus structure;
 a command processing section to issue high level commands for execution in the memory circuits;
 a memory circuit interface module to issue in sequence by the port to one or more of the memory circuits a series of instruction derived from the high level commands; and
 a queue manager to derive the series of instructions from the high level commands, wherein, when deriving a series of instruction from a set of high level data access commands, the queue manager modifies timing for the issuance to the memory circuit interface module of memory circuit check status instructions based upon feedback from the memory circuit interface module and the state of earlier instruction in the series derived from the set of high level data access commands.

2. The controller circuit of claim 1, wherein the queue manager modifies timing for the issuance to the memory circuit interface module of memory circuit check status instructions the queue manager based on one or more timers.

3. The controller circuit of claim 2, wherein the queue manager starts one of the timers in response to the queue manager transferring an access instruction to the memory circuit interface module.

4. The controller circuit of claim 2, wherein the queue manager starts one of the timers in response to the memory circuit interface module issuing an access instruction to one of the memory circuits.

5. The controller circuit of claim 4, wherein the queue manager further starts another one of the timers in response to the queue manager transferring an access instruction to the memory circuit interface module.

6. The controller circuit of claim 2, wherein the queue manager sets a value of one or more of the timers based upon a corresponding instruction with which the corresponding timer is associated.

7. The controller circuit of claim 6, wherein the queue manager further sets the value of one or more of the timers based upon the remaining value of one or more previously set timers.

8. The controller circuit of claim 1, wherein the set of high level data access commands is a sequence of write commands.

9. The controller circuit of claim 1, wherein the set of high level data access commands is a sequence of read commands.

10. The controller circuit of claim 1, wherein the memory circuit interface module issues instructions by the port for a first plurality of memory circuits managed as a single thread in which a instructions for the first plurality of memory circuits are interleavable.

11. The controller circuit of claim 1, wherein the controller circuit manages the memory circuits as a plurality of N threads, each thread corresponding to one or more of the memory circuits, wherein the controller circuit additionally includes (N−1) memory circuit interface modules that issues instructions by the port, each of the memory circuit interface modules assigned to a corresponding one of the N threads.

12. The controller circuit of claim 11, wherein the memory circuit interface is common to the N threads.

13. The controller circuit of claim 12, where the memory circuit includes a plurality of N memory circuit interface module each corresponding to one of the N threads.

14. The controller circuit of claim 1, wherein the queue manager orders subsequent instructions in the series in response to replies from the one or more memory circuits to the check status instructions.

15. The controller circuit of claim 1, wherein the wherein the one or more memory circuits' responses to the check status instructions include a true ready response.

16. The controller circuit of claim 1, wherein the wherein the one or more memory circuits' responses to the check status instructions include a cache ready response.

* * * * *